United States Patent
Anderson et al.

(10) Patent No.: US 9,590,400 B2
(45) Date of Patent: Mar. 7, 2017

(54) TERMINAL FEEDTHROUGH

(71) Applicant: Rosemount Inc., Shakopee, MN (US)

(72) Inventors: Erik D. Anderson, Bloomington, MN (US); Jeffery A. Cota, Rosemount, MN (US); Samuel E. Messenger, Chaska, MN (US); Michael J. Mayer, Waconia, MN (US); Michael J. Mikolichek, Farmington, MN (US); Michael W. Barto, Waconia, MN (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 14/718,681

(22) Filed: May 21, 2015

(65) Prior Publication Data

US 2016/0094020 A1   Mar. 31, 2016

Related U.S. Application Data

(60) Provisional application No. 62/057,695, filed on Sep. 30, 2014.

(51) Int. Cl.
*H02G 3/18* (2006.01)
*H02G 3/04* (2006.01)

(52) U.S. Cl.
CPC ......... *H02G 3/0412* (2013.01); *H02G 3/0437* (2013.01)

(58) Field of Classification Search
CPC ........................... H02G 3/0412; H02G 3/0437
USPC ........................................................ 174/650
See application file for complete search history.

(56) References Cited

U.S. PATENT DOCUMENTS

| | | | |
|---|---|---|---|
| 3,779,078 A * | 12/1973 | Kaesser | G01K 1/14 174/152 R |
| 4,934,742 A | 6/1990 | Williamson | |
| 5,485,673 A | 1/1996 | Lau | |
| 5,678,866 A * | 10/1997 | Mina | H02G 3/0616 174/153 A |
| 6,109,979 A | 8/2000 | Garnett | |
| 6,331,674 B1 * | 12/2001 | Zolock | G01F 1/8409 174/60 |
| 6,526,212 B1 | 2/2003 | Mishriky et al. | |
| 7,329,149 B2 | 2/2008 | Montena | |
| 2002/0192993 A1 * | 12/2002 | Decicco | H01R 13/527 439/271 |
| 2009/0158992 A1 * | 6/2009 | Manahan | G08B 5/36 116/207 |
| 2010/0232542 A1 * | 9/2010 | Miyoshi | H04L 1/0041 375/295 |

(Continued)

OTHER PUBLICATIONS

Search Report and Written Opinion for International Application No. PCT/US2015/051740, date of mailing: Dec. 30, 2015, date of filing: Sep. 23, 2015, 11 pages.

*Primary Examiner* — Sherman Ng
(74) *Attorney, Agent, or Firm* — Christopher R. Christenson; Kelly, Holt & Christenson, PLLC

(57) ABSTRACT

A terminal feedthrough is provided. The terminal feedthrough includes a terminal pin insert having a pair of ends. A polymeric body having an externally threaded region is disposed about the terminal pin insert to form an interface with the terminal pin insert. At least one of threads of the externally threaded region and a cylindrical pin interface is configured to provide a flame-quenching pathway.

14 Claims, 3 Drawing Sheets

(56) References Cited

U.S. PATENT DOCUMENTS

2013/0294862 A1\* 11/2013 Manahan .............. E05B 65/001
  411/166

\* cited by examiner

TERMINAL FEEDTHROUGH

CROSS-REFERENCE TO RELATED APPLICATION

The present application is based on and claims the benefit of U.S. Provisional Patent Application Ser. No. 62/057,695, filed Sep. 30, 2014.

BACKGROUND

A feedthrough generally allows an electrical signal or electrical power to pass through a wall or similar structure. Feedthroughs may be used to pass one or more conductors from an enclosure of an electronic device to an ambient environment, or to pass one or more conductors to another compartment of the electronic device, while maintaining electrical isolation from the enclosure, other feedthroughs, and other conductive connections or circuitry.

While feedthroughs are widely used, a relatively smaller set of feedthroughs are used to ensure that ignitions that may occur within an enclosure or a specific compartment of the device are not propagated through the feedthrough and ignite either the surrounding atmosphere or atmosphere in another compartment. An ignition inside a sufficiently robust housing will also induce appreciable pressure, both due to the initial explosion pressure, and due to secondary ignitions or pressure waves due to pressure piling. Accordingly, the feedthrough's construction must also be able to withstand the pressure of such an explosion, in order to contain the ignition source. Further, the feedthrough joint may permit the products of combustion, and the resulting expansion of gases, to be relieved through the joint but may not permit the flame front to ignite the atmosphere either in another compartment of the device or external to the housing. This is generally accomplished with a suitable flame-quenching pathway. This is particularly important in environments where an electrical device may be operating in an atmosphere that is flammable or even explosive. In such cases, the feedthrough must be designed to comply with applicable standards to ensure that if the circuitry within the enclosure could generate a spark with sufficient energy to ignite the atmosphere, or if the circuitry has components with high enough surface temperatures that could generate ignition, that such flame front cannot pass through the feedthrough, and the feedthrough can withstand the resulting explosion pressure. Terminating the feedthrough for permanent wiring or circuit connections, whether during construction of the device or upon installation of the device, may be realized with a terminal block or wiring. Terminal blocks and wiring used in explosive atmospheres may make use of non-sparking, non-arcing construction such that the spacing of the conductors, and the insulative material of the terminal block itself ensures adequate isolation of the electrical connections from other conductive mediums. This isolation and securing of electrical potentials one from another ensures that no ignition of the flammable atmosphere can occur as no potential arc-points are created. This protection concept is widely referred to in a number of ways, including non-arcing, non-sparking, type e (increased safety), or non-incendive equipment.

One common way in which flame-proof or explosion-proof feedthroughs are provided is by passing one or more wires through a cemented joint. In order to create the cemented joint, a cement or suitable mixture, such as epoxy or a similar resin system, is poured or otherwise formed between the wires and a sidewall of the feedthrough. The sidewall of the feedthrough may then be coupled to a suitable aperture in an enclosure. In some instances, the cement or mixture may extend directly from the wire(s) to the enclosure wall. When the cement or epoxy cures or otherwise hardens, the result is a robust construct that is able to resist the pressure of an internal explosion, and provides a seal from flame propagation from one side of the joint to the other.

One limitation of a cemented or epoxied explosion-proof joint is that the quality and/or consistency of the cemented joint is determined by the mixture, the mixing process, and/or the presence of air bubbles in the cement/epoxy compound during joint formation. Further still, once the cemented joint has hardened or cured, it is still occasionally possible for the joint itself to crack thereby providing a potential path for a flame through the joint. Another limitation of cemented flame-proof joints is that they are relatively labor intensive to create.

Providing an easy to implement, low cost flame-proof/ increased safety/non-arcing feedthrough would significantly benefit the industries that provide electronic devices for such flammable environments.

SUMMARY

A terminal feedthrough is provided. The terminal feedthrough includes a terminal pin insert having a pair of ends. A polymeric body having an externally threaded region is disposed about the terminal pin insert to form an interface with the terminal pin insert. At least one of the thread interface of the polymeric body and the terminal pin interface is configured to provide a flame-quenching pathway.

DETAILED DESCRIPTION OF ILLUSTRATIVE EMBODIMENTS

In accordance with an embodiment of the present invention, a terminal feedthrough is provided that utilizes a threaded joint and cylindrical joint flame path geometry in addition to the feedthrough itself being able to be used as a terminal block connection point suitable for use as an 'increased safety' connection. Careful construction of the polymer and geometry of the conductor in the feedthrough was used in order to facilitate certification with appropriate regulatory bodies. Further, devices employing this approach are relatively easy to manufacture. The geometry of the polymeric portion (described below) and the internally threaded pin is configured in such a way to allow the feedthrough to function as an increased safety termination point by itself with no other interposition mediums required.

Figure 1A:
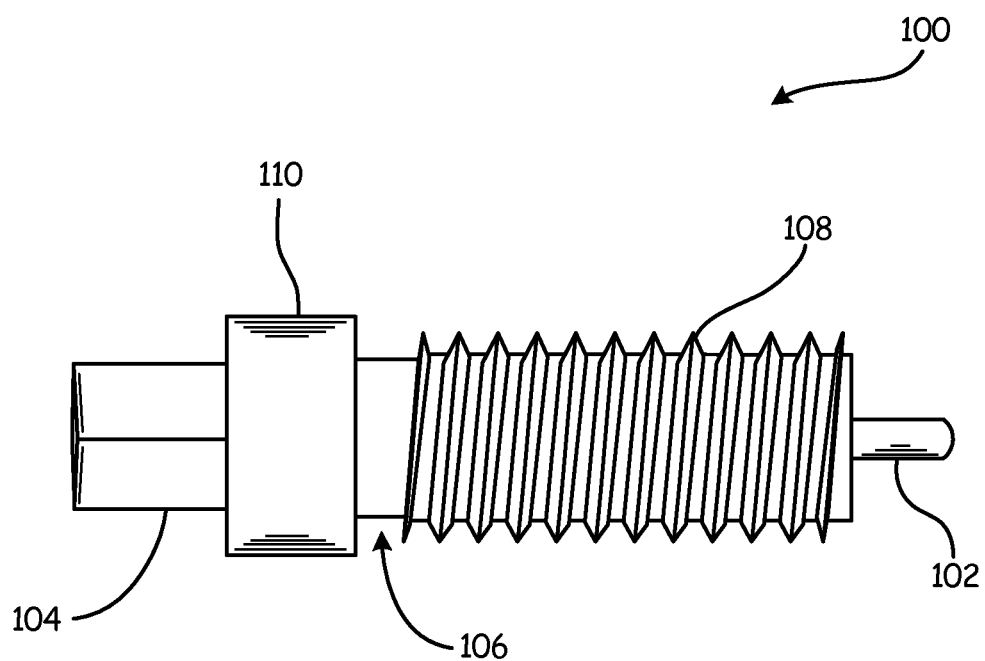
FIGS. 1A and 1B are side elevation and perspective views, respectively, of a terminal feedthrough in accordance with an embodiment of the present invention.

FIG. 1A is a diagrammatic side elevation view of a terminal feedthrough in accordance with an embodiment of the present invention. Feedthrough 100 includes terminal pin insert 102 having a pair of ends. In one embodiment, one end of terminal pin insert 102 comprises a hexagonally shaped head 104 that facilitates the utilization of standard tools in order to drive terminal feedthrough 100 into a threaded aperture in an enclosure wall. In one embodiment, terminal pin insert 102 is formed of brass. However, other suitable conductive materials can be used for terminal pin insert 102 in accordance with embodiments of the present invention.

Terminal feedthrough 100 includes polymeric body 106 that is molded about terminal pin insert 102. Polymeric body 106 may be formed of any suitable polymer that is selected to provide material properties that facilitate maintaining protection requirements when exposed to chemicals and aging (heat, humidity, and cold). However, in one embodiment, polymeric body 106 is formed of an injection-moldable plastic. Polymeric body 106 includes threaded portion 108 that is externally threaded to engage with a corresponding internally threaded aperture of an enclosure wall. In one embodiment, the pitch and total number of turns comprising the threads of threaded region 108 is selected to comply with a threaded flame path geometry in accordance with suitable governing bodies' standards for flame-proof/explosion-proof enclosures. Examples of industry-accepted approval standards include CSA, UL, FM, ATEX, and IECEx to provide safety requirements relative to areas where flammable atmosphere may be present, and may be referred to as hazardous or 'Ex' (Explosive Atmospheres) areas. One example of a flameproof-proof rating for a terminal feedthrough is an IEC certification marking Ex d IIC Gb, in accordance with IEC 60079-0, and IEC 60079-1 for use in potentially explosive gas atmospheres. An 'Increased Safety' typical terminal block used in a similar environment may be marked Ex e IIC Gb, in accordance to IEC 60079-0 and IEC 60079-7.

Since hexagonally-shaped head 104 is used to drive the threads of threaded portion 108 into engagement with an internally-threaded aperture in an enclosure wall, embodiments of the present invention include terminal pin insert 102 having a non-circular cross section such that a higher torque can be received by hexagonally-shaped head 104 before terminal pin insert 102 will begin to slip within polymeric body 106. However, the more complex the cross-section, the more difficult it is to ensure a sufficiently small flame path interface between terminal pin insert 102 and polymeric body 106.

Polymeric body 106 preferably includes collar 110 that has an outside diameter that is sized larger than the maximum outer diameter of threaded region 108. In this way, collar 110 will act as a stop when terminal feedthrough 100 is threaded into a corresponding threaded aperture in order to create a flame-proof or explosion-proof feedthrough coupling. Electrically, Collar 110 functions as needed creepage and clearance spacing of the exposed hexagonally-shaped conductor. Modification of both the creepage and clearance specifications can easily be changed.

Figure 1B:
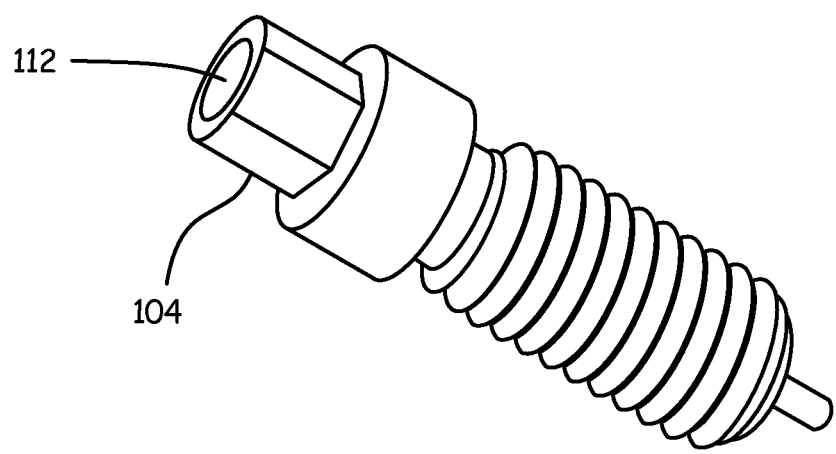

FIG. 1B is similar to FIG. 1A but shows a portion of hexagonally-shaped head 104 having an internal aperture 112. This internal aperture 112 is preferably threaded such that a terminal screw or other suitable fastener screw can be threaded into hexagonally-shaped head 104 in order to facilitate an electrical connection. Accordingly, any suitable type of connector that can be screwed or otherwise fastened to internal aperture 112 can be used. Such connectors includes, without limitation, a solder terminal, a spade terminal, a ring terminal, et cetera.

Figure 2:
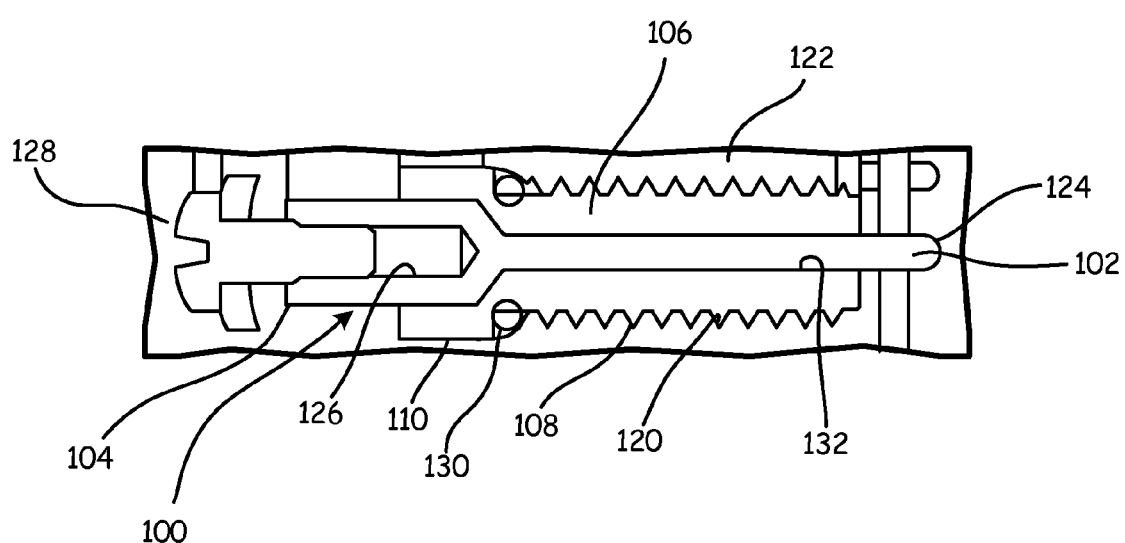
FIG. 2 is a diagrammatic cross sectional view of a terminal feedthrough engaged in an enclosure wall to provide a flame-proof coupling in accordance with an embodiment of the present invention.

FIG. 2 is a diagrammatic cross sectional view of a terminal feedthrough engaged in an enclosure wall to create a flame-proof/explosion-proof coupling in accordance with an embodiment of the present invention. As shown in FIG. 2, terminal feedthrough 100 is threaded into internal aperture 120 of enclosure wall 122. More particularly, threaded portion 108 of polymeric body 106 is engaged with the internally threaded aperture 120 in enclosure wall 122. FIG. 2 also shows terminal pin insert 102 extending from distal portion 124 to hexagonally-shaped head 104. Further still, terminal pin insert 102 is a solid, unitary structure. While terminal pin insert 102 may be formed completely of brass, embodiments of the present invention can be practiced where terminal pin insert 102 is plated with any suitable metal or alloy in order to facilitate electrical connections, such as gold plating. As shown in FIG. 2, hexagonally-shaped head 104 shows an internally threaded aperture 126 that receives terminal screw 128 in order to mount a terminal.

In this embodiment, an important feature of the flame-proof or explosion-proof feedthrough shown in FIG. 2 is the provision of an environmental seal between polymeric body 106 and enclosure wall 122. This seal is preferably in the form of O-ring 130 disposed about polymeric body 106 proximate collar 110. O-ring 130 is formed of any suitable elastomer. O-ring 130 compresses between terminal feedthrough 100 and the enclosure to improve the sealing strength and capacity. The seal prevents the ingress of environmental contaminants, such as dust, moisture, et cetera into the compartment. This environmental seal between the two compartments helps to maintain the quality and accuracy of devices which employ such a connection and which may operate in adverse and varied climates.

Interface 132 between terminal pin insert 102 and polymeric body 106 is also designed to be a compliant flame path geometry. For example, the length of the interface and/or gap between terminal pin insert 102 and polymeric body 106 is selected to comply with explosion-proof/flame-proof standards. In this way, pressure can be relieved but any flame travelling along the interface will be quenched and thus not able to reach the opposite end of the interface.

Figure 3:
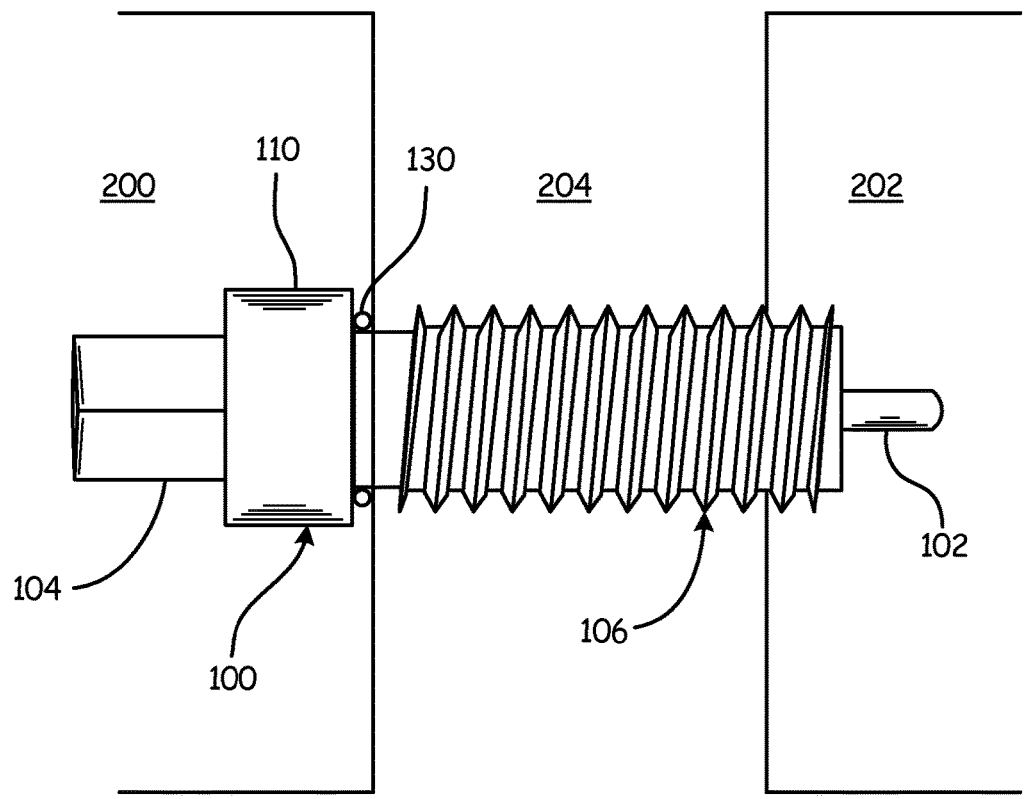
FIG. 3 is a diagrammatic view of a terminal feedthrough engaged in an enclosure wall separating a pair of compartments in accordance with an embodiment of the present invention.

FIG. 3 is a diagrammatic view of a terminal feedthrough engaged in an enclosure wall separating a pair of compartments in accordance with an embodiment of the present invention. FIG. 3 depicts terminal feedthrough 100 providing an electrical coupling between compartments 200 and 202 through wall 204. Polymeric body 106 is threaded into an aperture in wall 204 until collar 110 compresses seal 130 against wall 204. Once terminal feedthrough 100 is so engaged, a flameproof and/or explosion-proof coupling is provided between compartments 202 and 204.

The embodiments of the terminal feedthrough set forth above with respect to FIGS. 1A, 1B, 2 and 3 are not shown with any particular dimensions. This is deliberate in that the design is easily scalable to allow for higher electrical ratings and/or capacities simply by adjusting the overall size of the device.

Although the present invention has been described with reference to preferred embodiments, workers skilled in the art will recognize that changes may be made in form and detail without departing from the spirit and scope of the invention. For example, while embodiments of the present invention are generally described with respect to a single terminal pin insert disposed within a polymeric portion, embodiments of the present invention can be practiced where a plurality of such terminal pin inserts are provided within a single polymeric portion. In such embodiments, the collar of the polymeric portion may be hexagonally shaped in order to facilitate mounting with standard tools.

What is claimed is:

1. A terminal feedthrough comprising:
   a terminal in insert having a pair of ends, wherein at least one of the pair of ends is configured to facilitate an electrical connection;
   a polymeric body having an externally threaded region is disposed about the terminal in insert to form an interface with the terminal pin insert; and
   wherein the interface is configured to provide a flame-quenching pathway.

2. The terminal feedthrough of claim 1, wherein one end of the terminal pin insert is hexagonally shaped.

3. The terminal feedthrough of claim 1, wherein one end of the terminal pin insert includes an internally threaded aperture.

4. The terminal feedthrough of claim 1, wherein the polymeric body is formed of an injection moldable plastic.

5. The terminal feedthrough of claim 1, wherein the terminal pin has a non-circular cross section.

6. The terminal feedthrough of claim 1, wherein the polymeric body includes a collar having an outer diameter that is larger than a maximum outer diameter of the externally threaded region.

7. A flameproof coupling with increased safety connection comprising:
   an enclosure having an internally-threaded aperture;
   a terminal feedthrough threaded into the internally-threaded aperture, the terminal feedthrough including:
   a terminal pin insert having a pair of ends;
   a polymeric body disposed about the terminal pin insert to form an interface with the terminal pin insert, the polymeric body also having an externally threaded region engaged with the internally-threaded aperture, wherein the interface is configured to provide a flame-quenching pathway;
   wherein the polymeric body includes a collar having an outer diameter that is larger than a maximum outer diameter of the externally threaded region, the collar being configured to provide necessary/creepage and clearance; and
   a seal disposed about the polymeric body.

8. The flameproof coupling of claim 7, wherein an interface between the externally threaded region and the internally-threaded aperture is configured to provide a flame quenching pathway.

9. The flameproof coupling claim 7, wherein one end of the terminal pin insert is hexagonally shaped.

10. The flameproof coupling claim 7, wherein one end of the terminal pin insert includes an internally threaded aperture for possible use as an increased safety connection.

11. The flameproof coupling claim 7, wherein the polymeric body is formed of an injection moldable plastic.

12. The flameproof coupling claim 7, wherein the terminal pin insert has a non-circular cross section.

13. The flameproof coupling of claim 7, wherein the seal is an elastomeric seal.

14. The flameproof coupling of claim 7, wherein the seal is disposed to bear against the enclosure to form an environmental seal.

* * * * *

UNITED STATES PATENT AND TRADEMARK OFFICE
CERTIFICATE OF CORRECTION

PATENT NO. : 9,590,400 B2
APPLICATION NO. : 14/718681
DATED : March 7, 2017
INVENTOR(S) : Erik D. Anderson et al.

It is certified that error appears in the above-identified patent and that said Letters Patent is hereby corrected as shown below:

In the Claims

Column 5:
At Line 5 (Claim 1), delete "in" and insert -- pin --
At Line 9 (Claim 1), delete "in" and insert -- pin --

Column 6:
At Line 10 (Claim 7), remove the "/"

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*